A. F. PERRY.
Implement for Handling Shelf-Goods.

No. 227,444.   Patented May 11, 1880.

Witnesses:
R. G. Orwig.
Frank W. Heers.

Inventor:
Arthur F. Perry,
By Thomas G. Orwig,
Attorney.

UNITED STATES PATENT OFFICE.

ARTHUR F. PERRY, OF GRAND JUNCTION, IOWA, ASSIGNOR TO THOMAS SWIFT AND JOHN CALLAHAN, OF SAME PLACE, ONE-THIRD TO EACH.

IMPLEMENT FOR HANDLING SHELF-GOODS.

SPECIFICATION forming part of Letters Patent No. 227,444, dated May 11, 1880.

Application filed February 7, 1880.

*To all whom it may concern:*

Be it known that I, ARTHUR F. PERRY, of Grand Junction, in the county of Greene and State of Iowa, have invented an Implement for Reaching and Handling Shelf-Goods, of which the following is a specification.

The object of my invention is to provide an implement that is specially adapted for reaching and handling goods usually kept upon elevated shelves.

It consists in forming and combining two curved levers, a coiled spring, anti-friction pulleys, cords, and a handle with a suitable frame in such a manner that goods upon a shelf not within reach of a person standing upon the floor can be readily taken down or placed thereon without danger of letting them fall or injuring the goods, and without the aid and use of a step-ladder, all as hereinafter fully set forth.

Figure 1:
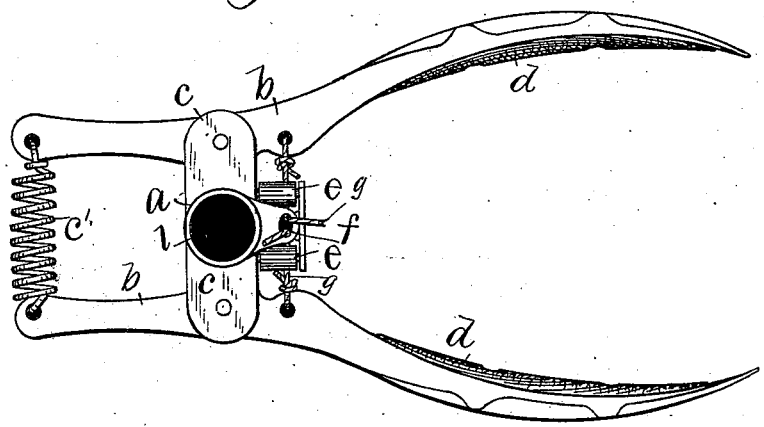
Figure 2:
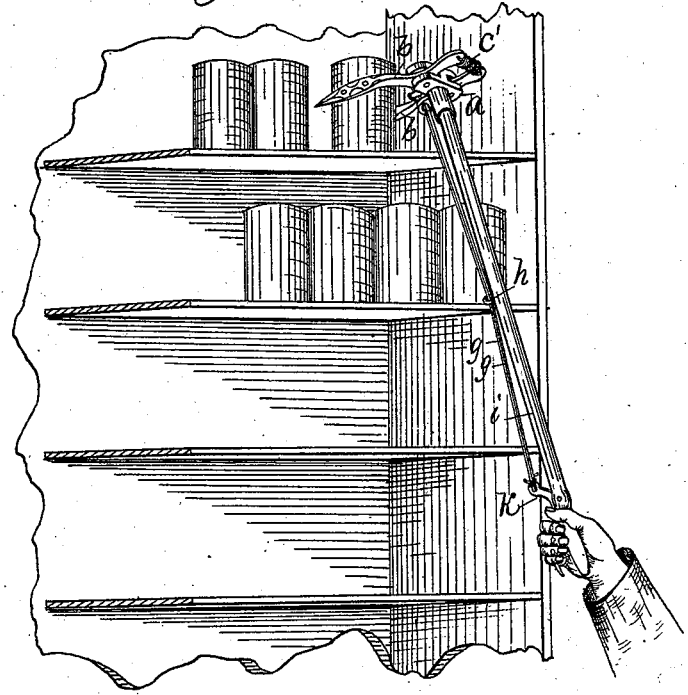

Figure 1 of my drawings is a top view of an inverted implement with the handle removed. Fig. 2 is a perspective view, showing the manner in which the implement is applied in taking goods from an elevated shelf. Together they clearly illustrate the construction, operation, and utility of my complete invention.

$a$ represents a cast-metal frame of T form. The short branches extending horizontally at the top of the frame $a$ have each a slot or recess, which adapts them to receive levers.

$b\ b$ are griping-levers pivoted in the slots of the branches or lever-bearers $c$. The long arms of the levers $b$ are curved outward, and thereby adapted in form to clasp cans, pails, and such other objects as may be placed on elevated shelves or suspended upon nails or hooks, as frequently occurs in shops and stores. They are preferably made of wrought or cast metal.

$c$ is a coiled spring that connects the ends of the short arms of the levers $b$, and in its normal condition holds the long arms apart or open, ready to clasp an object.

$d\ d$ represent rubber strips or any flexible and elastic material, secured to the concave side of the levers $b$ by means of rivets or in any suitable way, for the purpose of preventing articles from being scratched, dented, or in any way damaged by the griping-levers.

$e\ e$ represent pulleys mounted upon suitable bearings formed on or fixed to the frame $a$.

$f$ is a cord-guide in the shape of a perforated lug or ear, formed integral with the frame $a$, below the anti-friction pulleys $e$, to keep the cord upon the pulleys.

$g\ g$ are cords or wires attached to the long arms of the levers $b$ near the frame $a$, and then passed over and between the anti-friction pulleys $e$, down through the guide $f$, and through a second guide, $h$, fixed near the middle of the handle $i$, and from thence to the short end of a thumb-lever, $k$, that is pivoted to the lower end of the handle $i$.

By means of the cord and thumb-lever the griping-levers $b$ are readily operated as required to clasp an article firmly and lift it up or down.

The handle $i$ is secured to the frame $a$ by inserting its top end into a suitable socket, $l$, formed in the vertical or long branch of the frame, and then passing a bolt through the side of the socket and the inclosed end of the handle.

I claim as my invention—

As an improved article of manufacture, a griping-tool adapted to reach and handle shelf-goods, and composed of the T-shaped frame $a$, the levers $b\ b$, having flexible and elastic strips $d\ d$, a coiled spring, $c$, the cord-guide $f$, pulleys $e\ e$, the cords $g\ g$, and the handle $i$, having cord-guide $h$ and thumb-lever $k$, substantially as shown and described, for the purposes specified.

ARTHUR F. PERRY.

Witnesses:
THOMAS SWIFT,
JOHN CALLAHAN.